Nov. 5, 1940.  C. F. WOLTERS  2,220,189
INDEX STAND
Filed Sept. 1, 1939
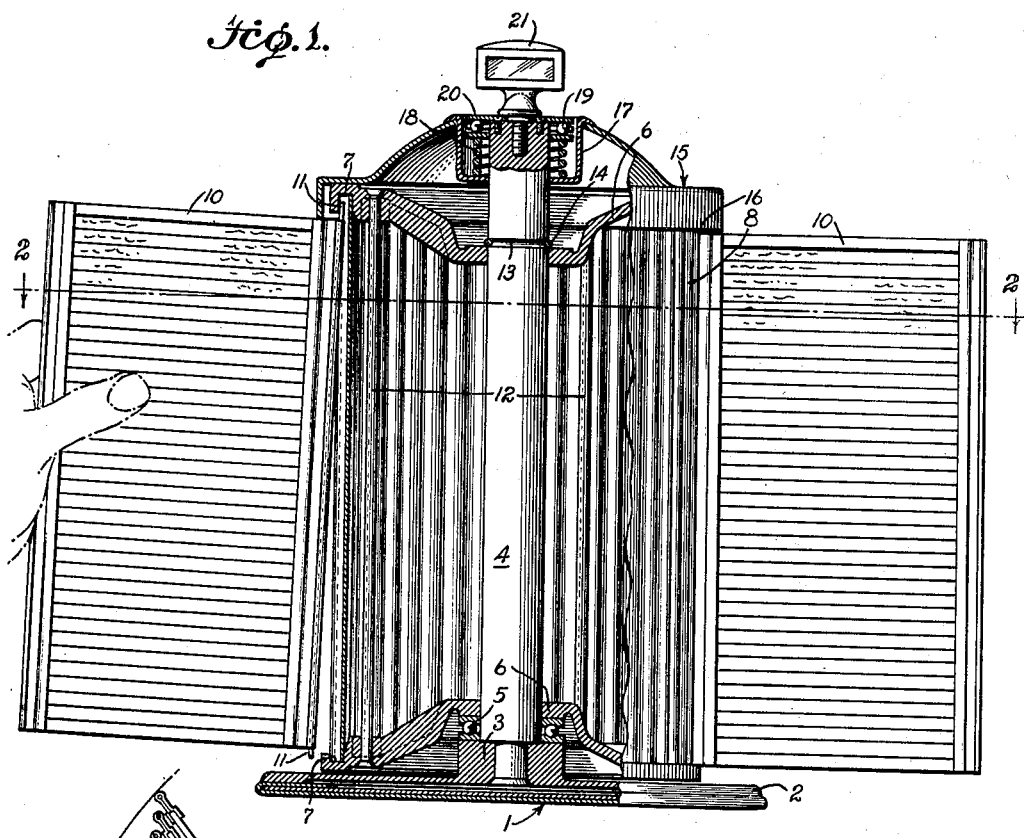
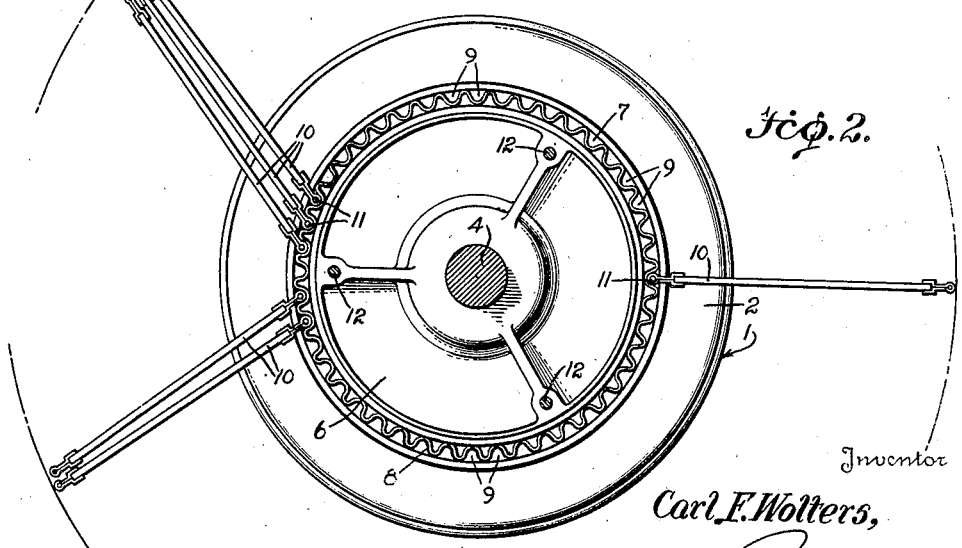
Inventor
Carl F. Wolters, Patented Nov. 5, 1940

2,220,189

UNITED STATES PATENT OFFICE 2,220,189

INDEX STAND

Carl F. Wolters, Kenmore, N. Y., assignor to Remington Rand Inc., Buffalo, N. Y.

Application September 1, 1939, Serial No. 293,016

7 Claims. (Cl. 40—72)

This invention relates to improvements in index stands, particularly those adapted to support one or more index carrying panels mounted for pivotal movement about one edge.

The invention comprehends the provision of an index stand for supporting a plurality of index panels, the stand being provided with a pair of end members assembled on opposite ends of a corrugated spacer member that retains the end members in spaced relation to pivotally mount the index panels, while suitable means is provided for retaining the end and spacer members in assembled relation. Tie members are provided to rigidly connect the end members for holding the end members in rigid engagement with opposite ends of the spacer member. Grooves are formed in said end members to receive the ends of the spacer member so that the corrugations of the spacer member will form pockets in the grooves in the end members. These pockets receive the pintles of the index panels for pivotally mounting the panels on the assembled structure.

The invention also comprehends the provision of a base having an upright post and forming a stand to rotatably support a pair of spaced parallel end members held in spaced relation by a corrugated spacer member having opposite ends seated in grooves in said end members to form pockets in cooperation with said end members to receive the pintles of index panels for pivotally mounting said panels between said end members, while suitable tie members hold the spacer and end members in rigid assembly for rotation about the post of said supporting member or stand.

In the drawing:

Fig. 1 is a side elevation of an index stand made in accordance with the invention showing portions broken away and in transverse section to illustrate the details of construction.

Fig. 2 is a horizontal cross section taken on line 2—2 of Fig. 1.

The stand preferably includes a suitable support generally indicated at 1, and comprises a base member 2 having a central upwardly extending projection 3 formed to receive and rigidly mount the post 4 thereon and also provide an annular support for ball bearing structure 5.

The pair of end members are indicated at 6 which are of identical form but arranged in opposed relation and spaced from each other in parallel relation. End members 6 have central openings that receive post 4 so that the end members are rotatable about said post. The margins of end members 6 are formed with annular grooves 7 that face each other in the aligned relation of end members 6 on post 4, as clearly shown in Fig. 1 of the drawing.

A corrugated spacing member 8 formed of suitable sheet metal is arranged in cylindrical form, as illustrated, the corrugations running longitudinally thereof. Opposite ends of corrugated spacer member 8 are engaged in grooves 7 of end members 6 as illustrated in the drawing, for rigidly assembling said end members together in spaced parallel relation and retaining them in position with respect to one another. At the same time spacer member 8 also divides grooves 7 into a plurality of pockets 9, the ones disposed on the outer face of the spacer member being aligned with the corrugations in said member and forming pockets to receive the pintles projecting from opposite ends of index panels 10. These pintles are indicated at 11. The pintles 11 at the lower ends of index panels 10 engage in pockets 9 in the lower end member while pintles 11 on the upper ends of panels 10 engage in pockets 9 in the upper end member. In this way, each index panel is pivotally supported in the end members and spaced apart by said spacer member 8, in the manner shown in Fig. 2. Spacer member 8 therefore performs a two-fold function in spacing index panels 10 also supporting end members 6 in spaced relation.

Panels 10 are constructed for mounting in end members 6, in a well known manner, by having upper pintle 11 engaged in a pocket 9 in upper end member 6 in such a manner that the pintle may be moved upwardly in pocket 9 of the upper end member.

Tie members 12 are extended through aligned openings in end members 6 inside of spacer member 8 in spaced parallel relation and the opposite ends are formed with heads as shown in the drawing, or they may be provided with other suitable means for rigidly connecting the end members in assembled relation on opposite ends of spacer member 8. These tie members 12 when put in place provide a rigidly assembled supporting unit for detachably receiving and pivotally supporting index panels 10.

The supporting unit thus formed is rotatable about post 4 and is seated on bearing 3 as shown in Fig. 1 for free rotation about said post. The upper end of post 4 is formed with an annular groove 13 which receives a split retaining ring 14 for normally preventing disengagement or longitudinal movement of the end members on post 4.

Panels 10 are normally retained against endwise movement between end members 6 by means of a retainer cap 15 having an outer annular flange that encloses upper end member 6, in the manner illustrated in Fig. 1. The lower edge of the outer annular flange indicated at 16 extends below the outer lower margin of end member 6 into adjacent relation with the upper edges of panels 10 in the normal seated position on the stand so that the panels can not be moved upwardly to disengage the lower pintle 11 from the lower end member without requiring an upward movement of retainer cap 15 away from upper end member 6.

Retainer cap 15 is provided with a cup 17 in the central portion thereof for receiving and housing coil spring 18 operating against ball bearing structure 19 carried by plate 20 secured on the upper end of post 4 by suitable screw and label holder 21. Spring 18 normally forces retainer cap 15 downwardly for retaining panels 10 pivotally engaged in the end members against detachment, as above described.

When a panel 10 is to be mounted in the stand, upper pintle 11 is engaged in a socket 9 in upper end member 6 as disclosed at the left hand side of Fig. 1. Then the panel is lifted upwardly so that the upper end engages the lower edge of flange 16 of cap 15 and raises cap 15 against the tension of spring 18 until the end of upper pintle 11 engages the end of socket 9. The lower pintle 11 is then swung into the aligned pocket 9 in the bottom end member and the panel allowed to move downwardly until the end of lower pintle 11 rests on end member 6 in the bottom of groove 7. This operation is reversed when a panel is removed.

The upper pintle 11 does not become disengaged from upper end member 6 when the lower pintle rests on bottom end member 6 in the bottom of groove 7. The corrugations in spacer member 8 effectively aid in determining aligned upper and lower pockets 9 and receive the edge of the panel in attached relation, spacing it from adjacent panels.

The unit formed by spacer member 8 and end members 6 forms an improved mounting for index panels 10 in which the corrugations in spacer member 8 provide for the structure of a spacer member from thin sheet material while producing a structure having substantial strength. The corrugations also guide the ends of panels 10 with their pintles into pockets 9 in applying or attaching a panel to the stand and prevent the engagement of lower pintles in pockets 9 that are out of alignment with the upper pockets in which the upper pintles have been engaged. The provision of spacer member 8 also provides a closed stand structure that prevents the accumulation of dust and dirt within the stand and at the same time provides a stand structure that is made of relatively few parts for ready assembly in proper spaced relation, due to the control of the spacing of end members 6 by the length of spacer member 8.

The invention claimed is:

1. An index stand comprising a pair of end members, a corrugated spacer member engaged between said end members for holding them in spaced relation and providing a plurality of grooves extending from one member to the other, said end members being formed in cooperation with said spacer member to provide pockets therein at the ends of said grooves to detachably receive pintles on the ends of index panels guided therein by said grooves and for detachably and pivotally mounting said panels on said stand, means for securing said end members in assembled relation on said spacer member, and means for mounting said members on a support.

2. An index stand comprising a pair of end members, a corrugated spacer member engaged with and extending between said end members for holding them in rigid spaced relation, said end members being formed to provide a groove in each arranged in opposed relation to each other for receiving opposite ends of said spacer member and providing pockets to receive the pintles on the opposite ends of index panels for detachably and swingably supporting a panel in each corrugation in said spacer member, and means for retaining said spacer member and end members in assembled relation on a support.

3. An index stand, comprising a pair of end members formed to provide grooves and arranged in spaced parallel relation with said grooves facing each other, a corrugated spacer member extending in substantially perpendicular relation between said end members with opposite ends seated in said grooves and forming a plurality of pockets for receiving pintles on the ends of index panels for pivotally mounting said panels with one edge of a panel in a corrugation of said spacer member for spacing thereby from another panel, means rigidly connecting said end members in assembled relation on said spacer member, and means for mounting said members on a support.

4. An index stand, comprising a pair of end members formed to provide grooves and arranged in spaced parallel relation with said grooves facing each other, a corrugated spacer member extending in substantially perpendicular relation between said end members with opposite ends seated in said grooves and forming a plurality of pockets for receiving pintles on the end of index panels for pivotally mounting said panels with one edge of a panel aligned with a corrugation in said spacer member for spacing said panel relative to another panel, a tie member secured at opposite ends to said end members for rigidly uniting said end and spacer members in assembled relation, and means for mounting said members on a support.

5. An index stand, comprising a pair of annular end members each formed with an annular groove in the marginal portions thereof arranged in opposed relation, a corrugated spacer member in cylindrical form extending between said end members with opposite ends seated in said grooves and forming pockets therein for receiving the pintles on opposite ends of index panels for pivotally supporting said panels on said stands, tie members connecting said end members for rigidly securing said members in assembled relation, and a support rotatably mounting said members.

6. An index stand, comprising a support having a base and an upright post thereon, a pair of end members having central openings receiving said post for rotation on said support, said end members having annular grooves in the margins thereof facing one another in aligned relation, a corrugated sheet metal spacer member of cylindrical form engaged between said end members with opposite ends seated in said grooves and forming a plurality of pintle pockets therein to receive pintles on opposite ends of index panels to pivotally support said index panels in said end members, and tie members rigidly securing said end members together on said spacer member for rotation on said support with the index panels carried thereby.

7. An index stand, comprising a support having a base and an upright post extending upwardly therefrom, a panel carrying unit rotatable about said post, bearing means between said unit and said base for supporting said unit for free rotation, said unit having a pair of end members, each rotatable about said post in spaced parallel relation and having an annular groove formed therein facing the groove in the other in aligned relation, a cylindrical spacer member formed to provide a plurality of longitudinally extending channels, the ends of said spacer member being seated in the grooves in said end members and forming pockets therein to receive pintles on opposite ends of index panels for pivotally supporting said panels on said unit, and tie members rigidly connecting said end members for retaining them in assembled relation on said spacer member.

CARL F. WOLTERS.